Sept. 20, 1971    W. C. SIMMONDS    3,605,263
HOLE CUTTER
Filed May 29, 1969

INVENTOR
WILLIAM C. SIMMONDS

BY
*Gregg & Henderson*
ATTORNEYS

United States Patent Office 3,605,263
Patented Sept. 20, 1971

3,605,263
HOLE CUTTER
William C. Simmonds, 6120 Elder Creek Road,
Sacramento, Calif. 95824
Filed May 29, 1969, Ser. No. 829,016
Int. Cl. B67b 7/24
U.S. Cl. 30—6.4                                    2 Claims

ABSTRACT OF THE DISCLOSURE

A hand-operated hole cutter with a pair of hardened cutting blades or prongs formed as portions of a surface of revolution and tapering slightly toward each other with gripping means at the rear thereof and a magnet therebetween.

BACKGROUND OF INVENTION

There have been developed a wide variety of devices for cutting or forming openings such as, for example, drills and the like. As distinguished from this type of device there have also been developed hole cutters primarily directed to the forming of a round opening in a relatively thin member such as, for example, a metal plate. Devices of this general type are available in a wide variety of configurations and are commonly comprised of cutting means including a hollow cylinder with teeth formed about the outer end thereof. Conventionally hole cutters are power operated as by a small electric motor.

The present invention is directed to a specific improvement in hole cutters particularly adapted for a certain application. This invention is directed to a manually operated hole cutter for paint can covers. The hole cutter hereof performs no grinding action so that no small particles are formed which might fall into paint. Furthermore, the cutter hereof is particularly designed for initially piercing the can cover and after cutting of a circular segment from the cover, retaining the segment so that upon withdrawal of the cutter the cutout portion is removed.

SUMMARY OF INVENTION

The hole cutter hereof is comprised of a pair of oppositely disposed prongs tapering to somewhat of a point and having cutting edges along the sides thereof. The cutting portion or prongs of the invention are formed generally as portions of a hollow cylinder which, however, has a slightly decreasing diameter toward the prong points. Between the prongs at the base thereof the invention provides a magnet for engagement with a metal segment cut out by the cutter and retention of such segment as the cutter is removed or withdrawn from a hole.

The hole cutter hereof further includes a handle disposed above the cutting portion and including a crosspiece, by means of which a person may grip the cutter to force it into material to be cut while twisting it to perform the cutting action.

DESCRIPTION OF FIGURES

The present invention is illustrated as to a single preferred embodiment thereof in the accompanying drawing wherein.

DESCRIPTION OF PREFERRED EMBODIMENT

Figure 1:
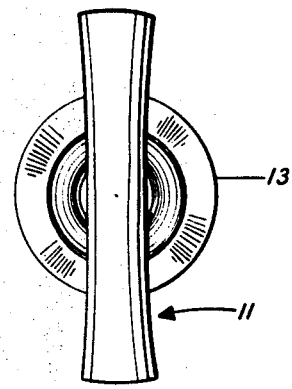
FIG. 1 is a top plan view of a hole cutter in accordance with the present invention.
Figure 2:
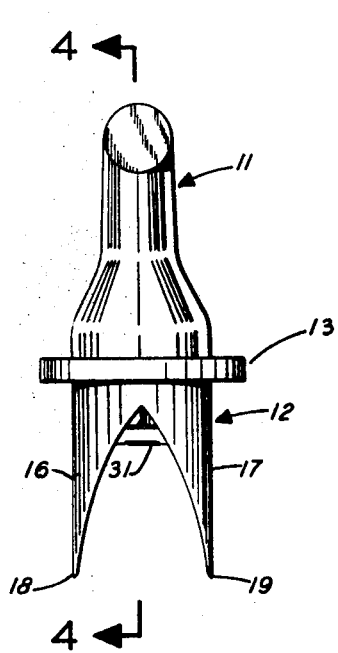
FIG. 2 is a side elevational view of the hole cutter of FIG. 1.
Figure 4:
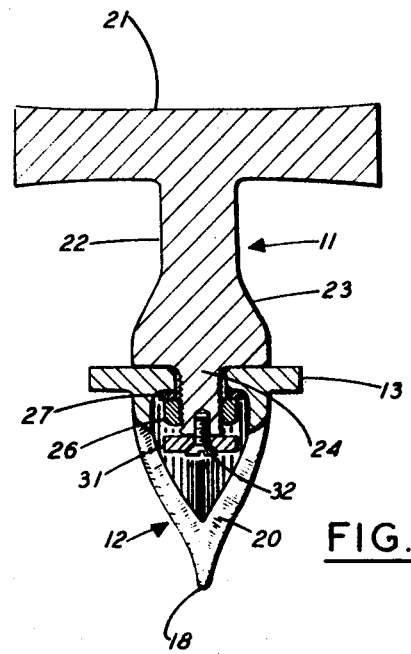
FIG. 4 is a central sectional view taken in the plane 4—4 of FIG. 2.
Figure 3:
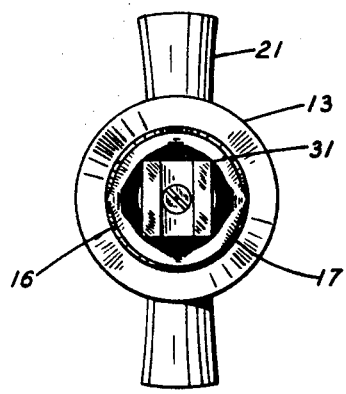
FIG. 3 is a bottom plan view of the hole cutter hereof.

Referring now to the drawings there will be seen to be illustrated a hole cutter in accordance with the present invention and comprising an upper handle portion 11 and a lower cutting portion 12. Considering first the cutting portion, same will be seen to be comprised as a generally cylindrical element formed of hardened steel and having a flange 13 about the top thereof. This flange 13 is both internal and external, as will be seen from the sectional view of FIG. 4. This generally cylindrical cutter 12 is formed with two oppositely disposed prongs 16 and 17 having curved sides as shown in FIGS. 2 and 4 and tapering to points 18 and 19, respectively. The prongs will be seen to have somewhat of a V shape in elevational projection and to be disposed diametrically opposite from each other in extension from the flange 13 to the points 18 and 19. The sides of the prongs 16 and 17 are sharpened as illustrated at 20 of FIG. 4 to form cutting edges. This sharpening, as by grinding or the like, is performed on the inner surface of the prongs so that the outer configuration of the cutter 12 remains generally cylindrical.

In addition to the aforementioned configuration of the cutting portion of the present invention, it is furthermore noted that while the cutter 12 has a generally cylindrical exterior configuration, it does in fact taper slightly inward toward the points of the prongs from the base at the flange. Thus the diameter of the cutter portion 12 immediately adjacent the flange 13 is slightly greater than the distance between the points 18 and 19 of the prongs 16 and 17. The overall cutter portion 12 is slightly tapered inwardly toward the points thereof. The degree of taper is quite small as, for example, a sixteenth of an inch in about two inches of cutter length. The presence of this taper and the direction thereof is, however, quite important, as is discussed further below in connection with operation of the present invention.

The handle 11 may be formed with a top crossbar 21 having a central depending shank 22 with an expanded base 23 adapted to fit upon the top of the cutter flange 13. A threaded boss 24, extending downward from the center of the expanded base 23, extends through the top of the cutter portion and the handle and cutter portion are held together by a nut 26 threaded on to the boss 24 with a washer 27 above the nut and thus bearing upon the underside of the internally extending cutter flange 13. The handle 11 may be formed of aluminum or any other desired structurally strong material and is shown to be provided as a T-shaped element. It is, of course, possible to alternatively form the handle as, for example, in the manner of a spade handle end. However, it is important that the handle include a transverse portion such as that shown in 21 of FIG. 4 because in use of the hole cutter hereof it is necessary for same to be rotated and the lateral extension of this portion of the handle provides a mechanical advantage in the application of the rotary force by the hand of the user.

A further portion of the present invention is a small magnet 31 mounted within the hollow cutter portion 12. This magnet 31 may be mounted by means of a metal screw or bolt 32 extending through an opening in the magnet and threaded into the lower end of the handle boss 24. This magnet is provided in illustrated position for the purpose of engaging and retaining a piece of metal removed by the hole cutter of the present invention.

Considering now utilization of the present invention, it is first noted that same is primarily directed to use for cutting a small round hole in the lid of a large container, such as a five gallon paint can. While some containers of this general type are made with small removable plugs or the like in the top, many are not so constituted. In order to readily use paint or the like from a container having a solid top, it is convenient to form a small circular opening in the top through which paint stirring apparatus may be inserted and also through which paint may be poured from the can or container. In order to form such an opening in the top of a paint can, for example, the hole cutter of the present invention is positioned vertically above the can with the points of the prongs engaging the top of the can. With the hole cutter held in its upright position by one hand of the user the cutter is then sharply struck on the top thereof at the crossbar 21 of the handle to puncture the can by forcing the prong points through the top thereof. The handle 11 is then firmly gripped by a hand of the user and the hole cutter forcibly rotated while being pressed downwardly by pressure of the palm of the hand on the crossbar 21 of the handle. This causes the cutting edges of the prongs to cut the material of the can top and as rotation continues a circular piece will be cut out of the top of the can by the hole cutter hereof. It will be noted that the magnet 31 is disposed in the cutting portion of the invention between the base of the prongs thereof and spaced somewhat from the flange 13. This magnet is located sufficiently near the points of the prongs that it will be certain to physically engage the material being cut before the hole is completed and the round portion entirely severed from the remainder. Thus when this "cutout" is completely severed, it will be in contact with the magnet and consequently held thereat so that it cannot fall from the hole. This is quite important in many applications wherein it is necessary to ensure that contents of a can or container, for example, in which there is formed an opening by the hole cutter is not contaminated or otherwise damaged by the cutout piece of metal falling therein.

As noted above, the cutting portion 12 of the present invention has a generally cylindrical configuration but tapers inwardly toward the points of the prongs or cutting blades. Thus, as the device is forced downwardly and at the same time rotated to cut a hole, the size of the hole is slightly increasing. Consequently, when the hole is completed the cutting portion of the invention may be readily withdrawn from the hole because of the fact that all of the cutter extending through the hole has a lesser diameter than the diameter of the hole itself. This has proven to be quite important. A further portion of the present invention should be noted, particularly as to function thereof, and such is the external flange 13 about the top of the cutting portion 12. The cutting operation has been described above and is again noted to be carried out by manual pressure downward upon the tool or device hereof while rotating same. As the last bit of metal is cut by the hole cutter thereof, the resistance to this downward pressure suddenly terminates and it would thus be possible for a user to plunge the rest of the cutter through the hole and smash the fingers of the hand gripping the handle. The present invention, however, prevents this occurrence by the provision of the flange 13 which has a greater diameter than the hole being cut. Thus, even if the user is unable to stop his downward pressure at the proper time when the hole is completed, the entire device will only enter the hole to the extent of the underside of the flange 13.

It will be appreciated that there has been described above a simple but highly useful hand tool for cutting holes in a relatively light metal or the like. The particular structure of the present invention admirably suits it to rapid and easy use. Of course the sharpened sides of the prongs or cutting blades of the present invention may be resharpened as by grinding, filling or the like. However, it is again noted that such should be carried out on the inner surface of these elements rather than the outer surface. This then ensures the cutting of a round opening and helps to guide the cutter as it is forced through the material being cut.

While the present invention has been described with respect to a single preferred embodiment thereof, it will be appreciated that variations of structure are possible. Reference is made to the following claims for a definition of the scope of the invention.

I claim:
1. An improved hole cutter comprising
   a cutter portion having a pair of oppositely disposed prongs with sharpened edges and pointed ends, said cutter portion having a cylindrical base with the outer surface of said prongs lying on a substantially cylindrical surface having a small continuous taper radially inward over the entire length thereof from the base to the points of the prongs,
   means defining a flange extending radially outward about the cylindrical base of said cutter portion,
   a handle portion connected to said cutter portion at the opposite end thereof from said prong points and having a crosspiece extending laterally of said prongs and spaced from said flange away from said prongs, and
   magnet means mounted between said prongs at a distance from the points thereof.
2. An improved hole cutter comprising a cutter portion having a pair of oppositely disposed prongs with sharpened edges and pointed ends, said cutter portion having a generally cylindrical outer configuration with portions cut out to define said prongs and said prongs gradually tapering toward each other from the top of the cutter portion to the points thereof, said cutter portion also having an internal and external flange about the top thereof, a handle portion connected to said cutter portion at the opposite end thereof from said prong points and having a top crosspiece with a shank extending therefrom to the top of said cutter portion with a threaded boss extending through the internal flange of the cutter portion, a nut threaded upon said boss within said cutter portion and locking together said handle and cutter portions, and magnetic means disposed between said prongs at a distance from the points thereof and said boss mounting said magnet means.

References Cited

UNITED STATES PATENTS

| | | | |
|---|---|---|---|
| 642,850 | 2/1900 | Russell | 30—6.4X |
| 1,789,729 | 1/1931 | Coyle | 30—6.4X |
| 3,487,965 | 1/1970 | Gale | 30—6.4X |

TRAVIS S. McGEHEE, Primary Examiner

U.S. Cl. X.R.

30—17, 130, 300